(12) United States Patent (10) Patent No.: US 9,297,659 B2
Lin (45) Date of Patent: Mar. 29, 2016

(54) COMPOSITE NAVIGATION SYSTEM

(71) Applicant: CHUNG HUA UNIVERSITY, Hsinchu (TW)

(72) Inventor: Jium Ming Lin, Hsinchu (TW)

(73) Assignee: CHUNG HUA UNIVERSITY, Hsinchu (TW)

( * ) Notice: Subject to any disclaimer, the term of this patent is extended or adjusted under 35 U.S.C. 154(b) by 27 days.

(21) Appl. No.: 14/446,069

(22) Filed: Jul. 29, 2014

(65) Prior Publication Data

US 2016/0033278 A1 Feb. 4, 2016

(51) Int. Cl.
  *G01C 21/00* (2006.01)
  *G01C 21/12* (2006.01)

(52) U.S. Cl.
  CPC ..................................... *G01C 21/12* (2013.01)

(58) Field of Classification Search
  CPC ........ G01C 21/28; G01S 19/06; G01S 13/025
  USPC ......... 701/468, 472, 532, 470, 476, 479, 480, 701/500, 503, 505, 509; 342/357.52, 342/357.74, 357.42, 104, 118
  See application file for complete search history.

(56) References Cited

U.S. PATENT DOCUMENTS

| 6,735,523 | B1 | 5/2004 | Lin et al. | |
|---|---|---|---|---|
| 7,209,221 | B2 | 4/2007 | Breed et al. | |
| 8,416,186 | B2 | 4/2013 | Yamamoto et al. | |
| 2005/0143916 | A1* | 6/2005 | Kim | G01C 21/28 701/472 |
| 2006/0129308 | A1* | 6/2006 | Kates | A61H 3/061 701/532 |
| 2006/0145463 | A1* | 7/2006 | Isaji | B60R 21/0134 280/806 |
| 2006/0181400 | A1* | 8/2006 | Cox | G06Q 10/087 340/505 |
| 2006/0286972 | A1* | 12/2006 | Kates | H04M 1/05 455/415 |
| 2010/0138115 | A1* | 6/2010 | Kageyama | B60R 21/0134 701/46 |
| 2010/0141483 | A1* | 6/2010 | Thacher | G01S 13/825 340/989 |
| 2012/0268308 | A1* | 10/2012 | Tuttle | G01S 13/582 342/42 |
| 2014/0297171 | A1* | 10/2014 | Minemura | G08G 1/166 701/301 |
| 2014/0336883 | A1* | 11/2014 | Thompson | B60P 1/045 701/50 |
| 2015/0234051 | A1* | 8/2015 | Moshfeghi | G01S 19/06 342/357.43 |

FOREIGN PATENT DOCUMENTS

TW 576928 2/2004
TW I372989 9/2012

OTHER PUBLICATIONS

Office Action and Search Report dated Jun. 2, 2015 from the Taiwan counterpart application 103125788.
English abstract translation of the Office Action dated Jun. 2, 2015 from the Taiwan counterpart application 103125788.
English abstract translation of TW 576928.
English abstract translation of TW I372989.
TW576928 is also published as U.S. Pat. No. 6735523 B1.
TWI372989 is also published as U.S. Pat. No. 8416186 B2.

* cited by examiner

*Primary Examiner* — Marthe Marc-Coleman
(74) *Attorney, Agent, or Firm* — WPAT, P.C.; Anthony King (57) ABSTRACT

A composite navigation system includes a first RFID apparatus, a GPS receiver, and a signal processing system. The first RFID apparatus includes an RFID chip and an antenna, a plurality of inclinometers, a plurality of linear accelerometers, and a plurality of angular accelerometers. The processing system includes a first RFID reader and a Kalman filter. The first RFID apparatus can communicate with the first RFID reader. The Kalman filter connects to the GPS receiver and the first RFID reader.

17 Claims, 8 Drawing Sheets

COMPOSITE NAVIGATION SYSTEM

BACKGROUND

1. Technical Field

The present invention relates to a composite navigation system.

2. Related Art

Currently, many automotive electronic appliances, such as GPS devices or event data recorders, are developed to provide assistance to drivers. However, despite the advantages of using such appliances, traffic accidents still frequently occur.

For example, when a combination vehicle attempts to make a turn while accelerating or experiencing side wind currents, the vehicle could excessively tilt and topple over. As a result, an accident will occur, causing harm to passengers and possibly other drivers as well.

In order to reduce the occurrences of serious vehicle accidents, an effective warning and preventive measure are required.

SUMMARY

In one embodiment, a composite navigation system includes a first RFID apparatus, a GPS receiver, and a signal processing system. The first RFID apparatus includes an RFID chip and an antenna, a plurality of inclinometers, a plurality of linear accelerometers, and a plurality of angular accelerometers. The processing system includes a first RFID reader and a Kalman filter. The first RFID apparatus can communicate with the first RFID reader. The Kalman filter connects to the GPS receiver and the first RFID reader.

To better understand the above-described objectives, characteristics and advantages of the present invention, embodiments, with reference to the drawings, are provided for detailed explanations.

BRIEF DESCRIPTION OF THE DRAWINGS

The invention will be described according to the appended drawings in which.

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

Figure 1:
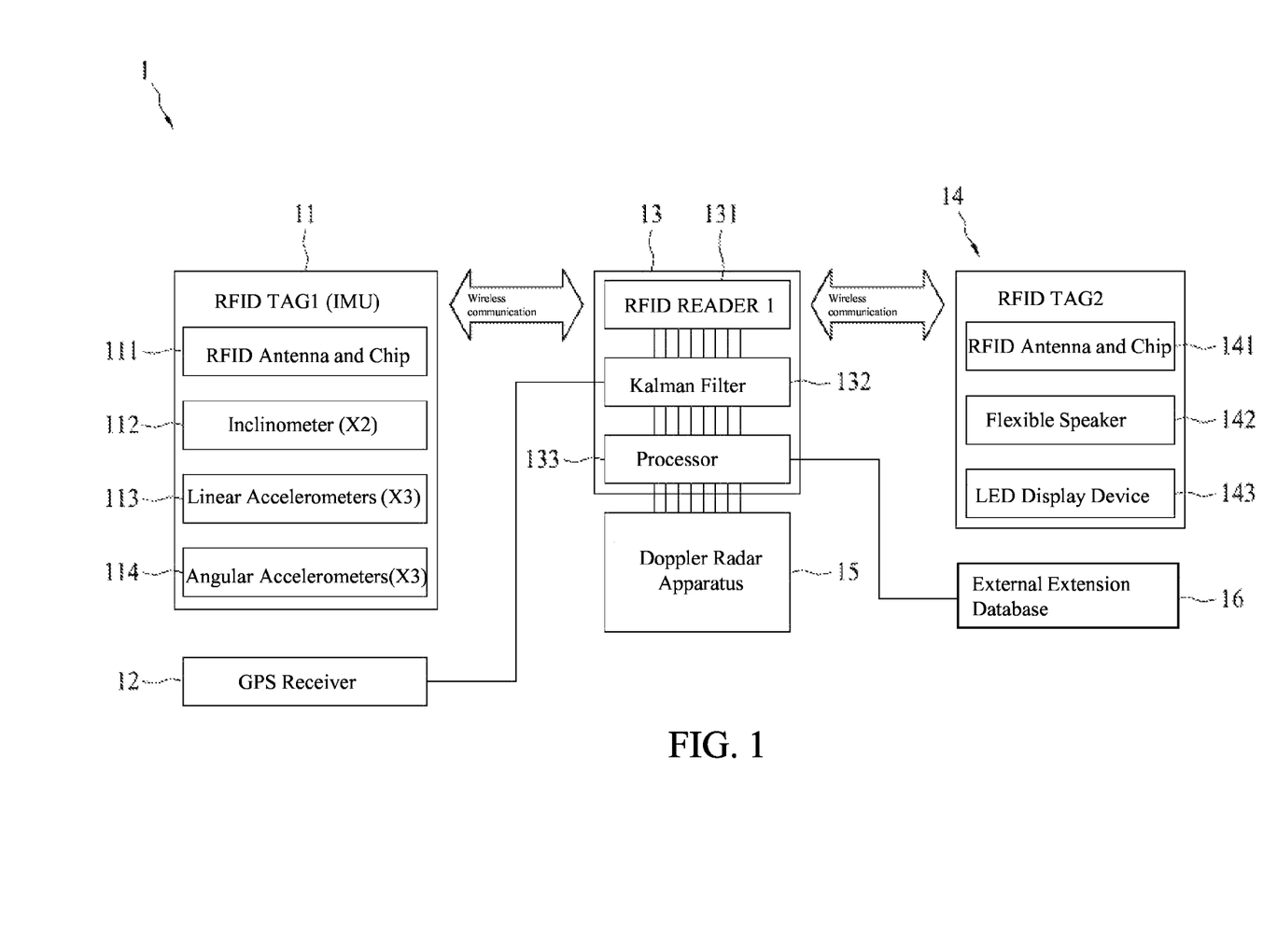
FIG. 1 is a view showing a composite navigation system according to one embodiment of the present invention.

Referring to FIG. 1, in at least one embodiment, a composite navigation system 1 comprises a plurality of first RFID (radio-frequency identification) apparatuses 11, a GPS receiver 12, and a signal processing system 13. The first RFID apparatuses 11 may be disposed on a vehicle or car to detect dynamic information of the vehicle. The first RFID apparatuses 11 is configured to submit detected dynamic information to the signal processing system 13 by a standard RFID communication protocol. The GPS receiver 12 is coupled with the signal processing system 13. The GPS receiver 12 may also be disposed on a vehicle to provide the signal processing system 13 with location information about the vehicle. In some embodiments, the signal processing system 13 is disposed on a vehicle.

Referring to FIG. 1, in some embodiments, the first RFID apparatus 11 comprises an RFID chip and an antenna 111. The signal processing system 13 comprises an RFID reader 131. The first RFID apparatus 11 communicates with the RFID reader 131 of the signal processing system 13 through the RFID chip and the antenna 111. In some embodiments, the RFID chip and the antenna 111 are formed on a substrate included in the first RFID apparatus 11.

Figure 2:
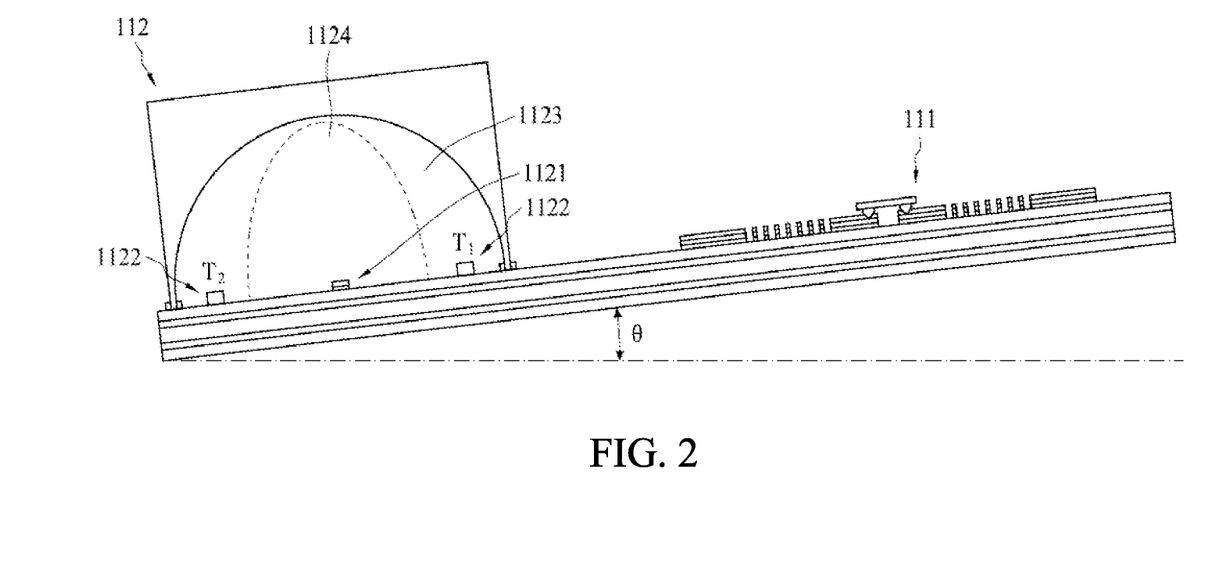
FIG. 2 is a view showing an inclinometer, an RFID chip, and an antenna according to one embodiment of the present invention.

Referring to FIGS. 1 and 2, in some embodiments, the first RFID apparatus 11 comprises at least one inclinometer 112. The inclinometer 112 is configured to measure an inclined angle of the vehicle. The first RFID apparatuses 11 can submit the measured inclined angle to the signal processing system 13.

Referring to FIG. 2, in some embodiments, the inclinometer 112 comprises a thermal convection inclinometer. The inclinometer 112 comprises a heater 1121 and two temperature sensors 1122 disposed on two sides of the heater 1121. The heater 1121 and the temperature sensors 1122 are located in a chamber 1123, which can have a hemi-cylindrical or hemi-spherical interior. The chamber 1123 can be filled with gas, such as xenon. Under the influence of the gravity and the filled gas in the chamber 1123, the heater 1121 generates a thermal bubble 1124. The inclined angle of a vehicle can be represented by the equation (1):

$$\Delta T = (T_1 - T_2) = A \times \theta \tag{1}$$

where $T_1$ and $T_2$ are temperatures measured by the temperature sensors 1122, and A is a constant.

In some embodiments, the first RFID apparatus 11 comprises two groups of one heater 1121 and two temperature sensors 1122, and the temperature sensors 1122 of the two groups can be connected as a Wheatstone bridge circuit. For further details about the connection, refer to U.S. patent application Ser. No. 13/685,398, the relevant content of which is incorporated herein by reference. In some embodiments, the RFID chip of the first RFID apparatus 11 comprises an amplifier, which is configured to amplify the voltage difference across the midpoints of the Wheatstone bridge circuit and to provide the amplified voltage to an analogue/digital (A/D) converter. A chip that has a part number of nRF9E5 and is manufactured by Nordic Semiconductor is an example of the RFID chip; however, the present invention is not limited to such an example. In some embodiments, a battery 115 is disposed in the first RFID apparatus 11.

In some embodiments, the composite navigation system 1 is used in a single vehicle. The composite navigation system 1 or the signal processing system 13 comprises a plurality of inclinometers 112. The composite navigation system 1 includes a lookup table for a single vehicle. The lookup table shows pitch-roll combinations, yaw turning rates (r), and warning methods and actions, as shown in Table 1. The composite navigation system 1 or the signal processing system 13 is configured to determine a pitch-roll combination (p=θ+Φ) according to a pitch angle (θ) and a roll angle (Φ), and then, select corresponding warning method and action for a driver according to the pitch-roll combination (p=θ+Φ) and a yaw turning rate (r) from Table 1.

TABLE 1

Warnings and actions for pitch-roll combination and combined yaw turning rate.

| | 0 < p < 10 | 10 < p < 20 | 20 < p < 25 | 25 < p |
|---|---|---|---|---|
| 0°/sec < r < 5°/sec | flashing a white LED light | generating warning sound and flashing a red LED | generating warning sound, flashing a red LED light, and initiating braking or closing the throttle to reduce speed | generating warning sound, flashing a red LED light, and initiating braking or closing the throttle to stop the vehicle |
| 5°/sec < r < 10°/sec | generating warning sound and flashing a red LED | generating warning sound, flashing a red LED light, and initiating braking or closing the throttle to reduce speed | generating warning sound, flashing a red LED light, and initiating braking or closing the throttle to stop the vehicle | generating warning sound, flashing a red LED light, and initiating braking or closing the throttle to stop the vehicle |
| 10°/sec < r | generating warning sound, flashing a red LED light, and initiating braking or closing the throttle to reduce speed | generating warning sound, flashing a red LED light, and initiating braking or closing the throttle to stop the vehicle | generating warning sound, flashing a red LED light, and initiating braking or closing the throttle to stop the vehicle | generating warning sound, flashing a red LED light, and initiating braking or closing the throttle to stop the vehicle |

In some embodiments, the composite navigation system 1 includes a plurality of first RFID apparatuses 11, which are used in a combination vehicle or a tractor-trailer. The inclinometers 112 of the plurality of first RFID apparatuses 11 respectively measure the yaw turning rates (r1 and r2), the pitch angles (θ1 and θ2), and roll angles (Φ1 and Φ2) of the vehicle units of the combination vehicle, wherein the vehicle units may comprise a tractor unit and a semi-trailer, or two semi-trailers. The composite navigation system 1 or the signal processing system 13 is configured to calculate the sum R (R=r1+r2) of the yaw turning rates, the sum θ (θ=θ1+θ2) of the pitch angles, and the sum Φ (Φ=Φ1+Φ2) of the roll angles. The composite navigation system 1 or the signal processing system 13 is configured to determine a pitch-roll combination (P=P1+P2; P1=θ1+Φ1; P2=θ2+Φ2). The composite navigation system 1 or the signal processing system 13 includes Table 2 as shown below, and the composite navigation system 1 or the signal processing system 13 select corresponding warning and action from Table 2 according to the pitch-roll combination P and the combined yaw turning rate R.

TABLE 2

Warnings and actions for pitch-roll combinations and combined yaw turning rates.

| | 0 < P < 10 | 10 < P < 20 | 20 < P < 25 | 25 < P |
|---|---|---|---|---|
| 0°/sec < R < 5°/sec | flashing a white LED light | generating warning sound and flashing a red LED | generating warning sound, flashing a red LED light, and initiating braking or closing the throttle to reduce speed | generating warning sound, flashing a red LED light, and initiating braking or closing the throttle to stop the vehicle |
| 5°/sec < R < 10°/sec | generating warning sound and flashing a red LED | generating warning sound, flashing a red LED light, and initiating braking or closing the throttle to reduce speed | generating warning sound, flashing a red LED light, and initiating braking or closing the throttle to stop the vehicle | generating warning sound, flashing a red LED light, and initiating braking or closing the throttle to stop the vehicle |
| 10°/sec < R | generating warning sound, flashing a red LED light, and initiating braking or closing the throttle to reduce speed | generating warning sound, flashing a red LED light, and initiating braking or closing the throttle to stop the vehicle | generating warning sound, flashing a red LED light, and initiating braking or closing the throttle to stop the vehicle | generating warning sound, flashing a red LED light, and initiating braking or closing the throttle to stop the vehicle |

Figure 3A:
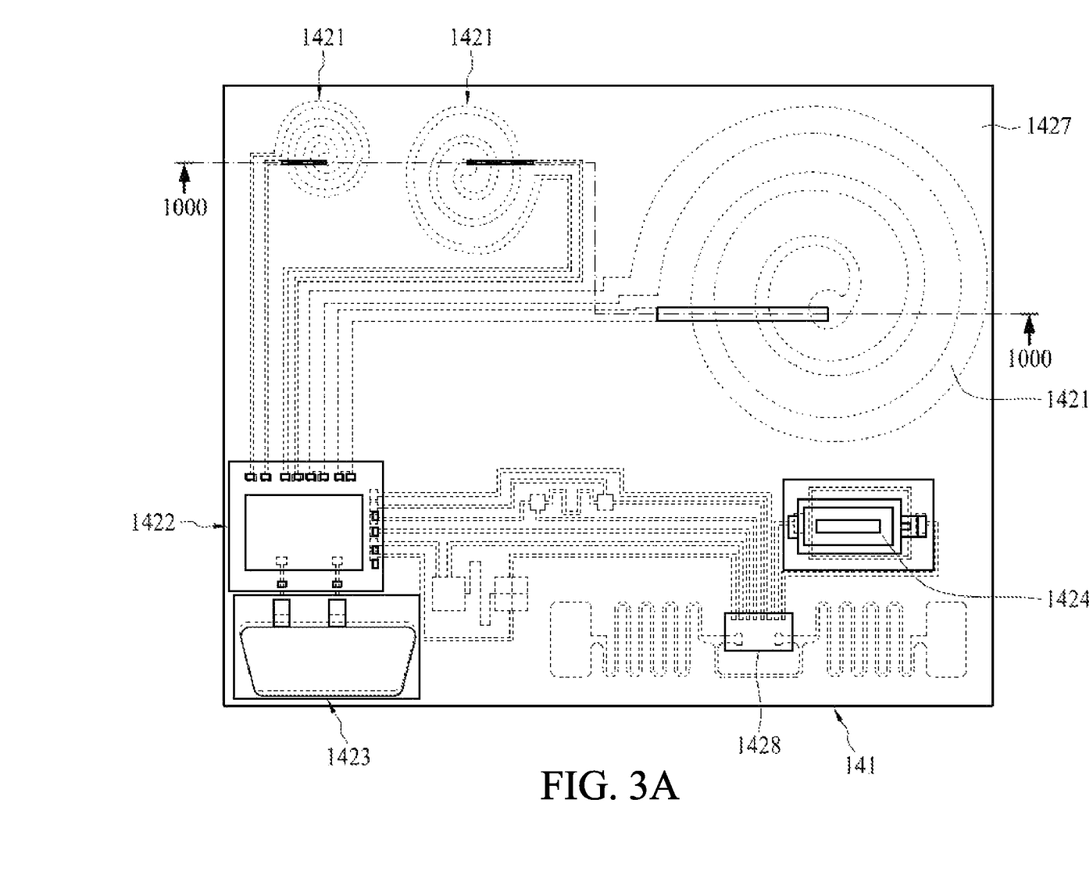
FIG. 3A is a view showing a flexible speaker according to one embodiment of the present invention.
Figure 3B:
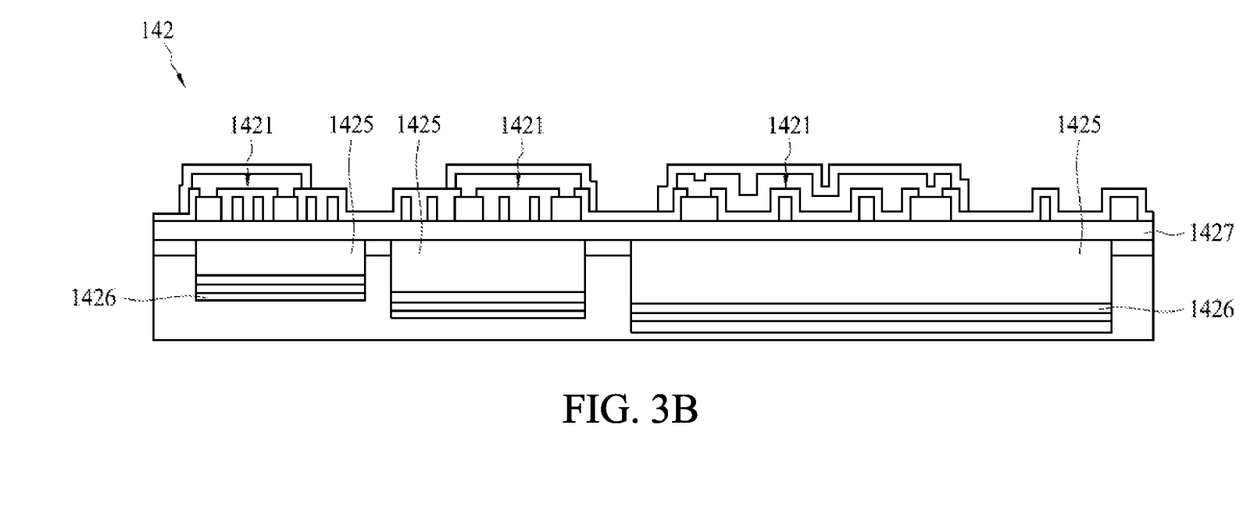
FIG. 3B is a cross-sectional view along line 1000-1000 of FIG. 3A.

Referring to FIGS. 1, 3A, and 3B, in some embodiments, the composite navigation system 1 may comprise a second RFID apparatus 14. The second RFID apparatus 14 comprises an RFID chip and an antenna 141. The second RFID apparatus 14 uses the RFID chip and the antenna 141 to communicate with the signal processing system 13.

In some embodiments, the second RFID apparatus 14 comprises a flexible speaker 142. After the second RFID apparatus 14 receives an instruction to issue a warning from the signal processing system 13, the second RFID apparatus 14 drives the flexible speaker 142 to generate a warning sound. In some embodiments, the flexible speaker 142 comprises a plurality of planar coils 1421 with different sizes. The coils 1421 with different sizes and a plurality of magnetic portions 1426 are used together to vibrate the flexible dielectric substrate 1427 of the flexible speaker 142 such that low-frequency sound, mid-frequency sound, and high-frequency sound is generated. The planar coils 1421 are formed on the flexible dielectric substrate. Below the planar coils 1421 are disposed a plurality of chambers 1425 for resonance of low, mid, and high-frequency sound and the plurality of magnetic portions 1426. Alternating current is applied to each planar coil 1421, causing the planar coil 1421 to generate magnetic fields and reverse magnetic fields. The magnetic fields and reverse magnetic fields cause pulling and repelling forces between the coils 1421 and the magnetic portions, resulting in the vibrations of the flexible dielectric substrate 1427. The vibrations cause air to move back and forth so as to generate sounds. For further details about the flexible speaker, refer to U.S. patent application Ser. No. 13/726,430, the relevant content of which is incorporated herein by reference. In some embodiments, the chambers 1425 and the magnetic portions 1426 are formed on a magnetic alloy plate. In some embodiments, the RFID chip and the antenna 141 are formed on the flexible dielectric substrate 1427 of the flexible speaker 142. In some embodiments, the flexible speaker 142 comprises an audio amplifier 1422. The audio amplifier 1422 can amplify an audio signal for the planar coil 1421. In some embodiments, the flexible speaker 142 comprises an audio socket 1423. The audio socket 1423 is configured to receive an audio signal. The audio socket 1423 can be coupled with the audio amplifier 1422. In some embodiments, the second RFID apparatus 14 comprises an RFID chip and an antenna 141, which can be the chip that has a part number of nRF9E5 and is manufactured by Nordic Semiconductor. In some embodiments, the signal processing system 13 is configured to select different planar coils 1421 to generate different sounds through the RFID chip. In some embodiments, the flexible speaker 142 of the second RFID apparatus 14 may include a battery 1424.

Referring to FIG. 1, in some embodiments, the second RFID apparatus 14 comprises an LED (light emitting diode) display device 143. The LED display device 143 comprises a plurality of LEDs with different colors. In some embodiments, The LEDs are disposed on the flexible dielectric substrate 1427 of the flexible speaker 142. In some embodiments, the composite navigation system 1 or the signal processing system 13 is configured to drive the LED display device 143 to emit white or red light according to Table 1 or 2.

Figure 4:
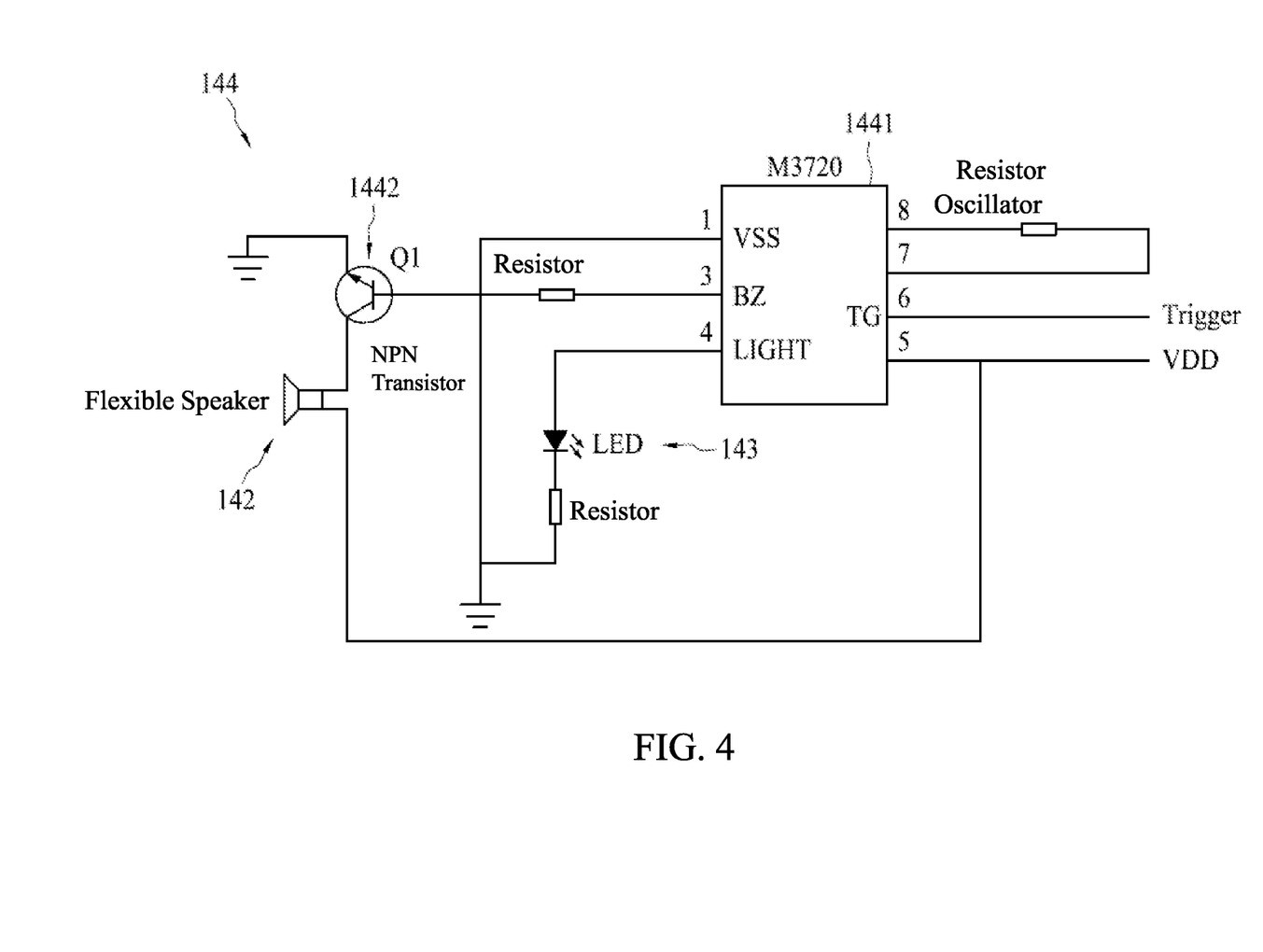
FIG. 4 is a view showing a circuit for generating sound or voice according to one embodiment of the present invention.

Referring to FIG. 4, the second RFID apparatus 14 comprises a warning circuit 144. The warning circuit 144 comprises a chip 1441, which may be the chip with part number M3720; however, the present invention is not limited to such an example. The chip 1441 includes an audio warning program. The chip 1441 can directly, or through an external power transistor, drive the flexible speaker 142 to generate sound. The chip 1441 can be coupled with the LED display device 143 through a light terminal to drive the LEDs to generate light. Moreover, the chip 1441 comprises a trigger terminal to receive a trigger signal and a terminal to connect with a power source $V_{DD}$.

In some embodiments, the composite navigation system 1 or the signal processing system 13 selects corresponding warning method and action from Table 1 according to a pitch-roll combination p and a yaw turning rate r, and provides a warning instruction for the second RFID apparatus 14 to cause the warning circuit 144 to drive the flexible speaker 142 to generate warning sound or to drive the LED display device 143.

Referring to FIG. 1, in some embodiments, the first RFID apparatuses 11 comprises a plurality of linear accelerometers 113 and a plurality of angular accelerometers 114. In some embodiments, the linear accelerometers 113 and the angular accelerometers 114 are used for measuring linear acceleration and angular acceleration of a vehicle, whereby the attitude, positioning, location, yaw turning rate, roll angle, and/or moving speed of the vehicle can be determined as a reference for road safety and navigation. In some embodiments, the plurality of linear accelerometers 113 comprises X, Y, and Z-axis accelerometers. In some embodiments, the linear accelerometer 113 comprises an X, Y, or Z-axis accelerometer of U.S. Pat. No. 8,307,708B2. Each accelerometer comprises two sensing assemblies, and each sensing assembly comprises a heater and two temperature-sensing elements disposed on two sides of the heater. Each sensing assembly is suspended over a corresponding cavity. The temperature sensing elements of the two sensing assemblies are connected as a Wheatstone bridge circuit, the relevant content of U.S. Pat. No. 8,307,708B2 incorporated herein by reference. In some embodiments, the linear accelerometer 113 comprises an X, Y, or Z-axis thermal convection linear accelerometer disclosed in U.S. patent application Ser. No. 13/685,398. The disclosed X, Y, or Z-axis thermal convection linear accelerometer comprises two linear acceleration-sensing devices. Each linear acceleration-sensing device comprises a heater and two temperature-sensing components disposed on two sides of the heater. Each linear acceleration-sensing device is directly formed on an insulating substrate. The temperature-sensing components of the two linear acceleration-sensing devices are connected as a Wheatstone bridge circuit. The relevant content of U.S. patent application Ser. No. 13/685,398 is incorporated herein by reference.

In some embodiments, the angular accelerometer 114 comprises the angular acceleration sensing device disclosed in U.S. patent application Ser. No. 13/932,730. The disclosed angular acceleration sensing device is disposed on an insulating substrate. The angular accelerometer 114 is used for measuring angular acceleration about an axis. The angular acceleration sensing device comprises a sensing group, which includes two temperature-sensing members and a heater disposed between the two temperature-sensing members. The distance between the two ends of the two temperature-sensing members closer to the rotating axis is greater than that between the other two ends distant away from the rotating axis. The relevant content of U.S. patent application Ser. No. 13/932,730 is incorporated herein by reference. In some embodiments, the angular accelerometer 114 comprises the angular accelerometer disclosed in U.S. Pat. No. 8,327,707 B2. The angular accelerometer comprises a flexible substrate, a base layer, at least one cavity, and at least one sensing assembly. The base layer is formed on the flexible substrate. The at least one cavity is formed on the base layer. The at least one sensing assembly is suspended over the at least one cavity. The sensing assembly comprises a heater and two temperature-sensing elements, wherein the two temperature sensing elements are substantially symmetrically disposed on opposite sides of the heater, and the heaters and the two temperature sensing elements extend in a radial direction. The relevant content of U.S. Pat. No. 8,327,707 B2 is incorporated herein by reference.

Referring to FIG. 1, the composite navigation system 1 comprises a GPS receiver 12 and the first RFID apparatus 11 comprises a Kalman filter 132 connected with the GPS receiver 12 and the RFID reader 131.

Figure 5:
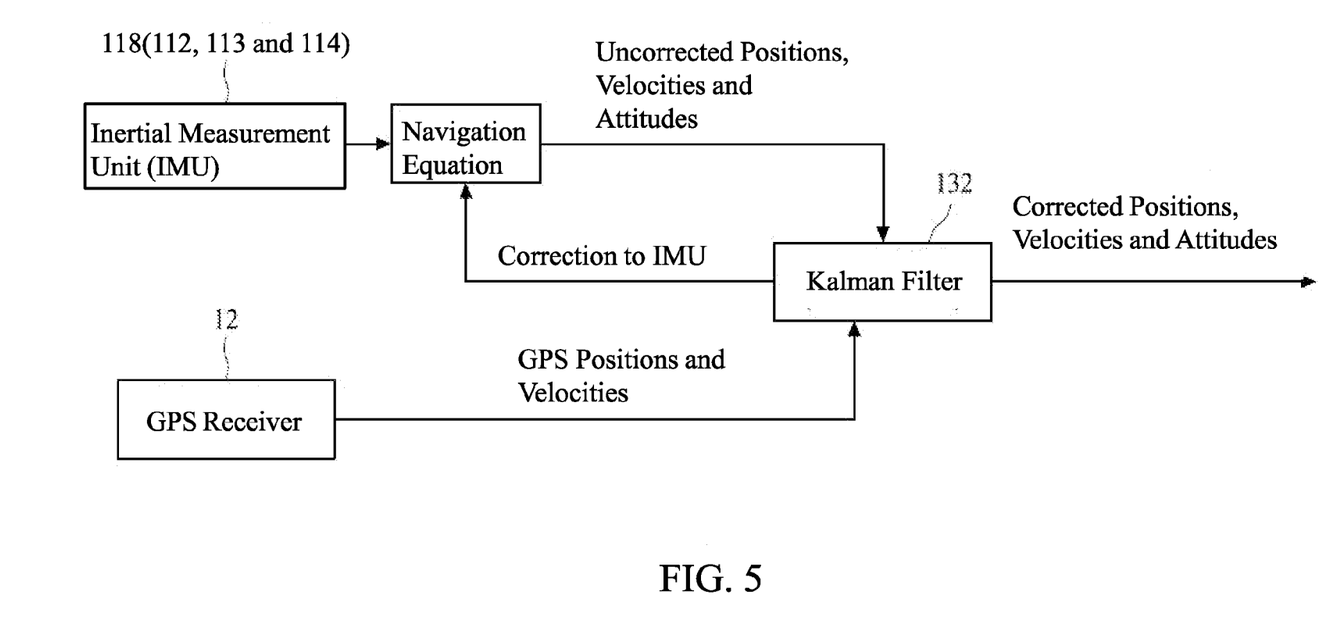
FIG. 5 is a flow chart showing a method for a Kalman filter according to one embodiment of the present invention.

Referring to FIG. 5, the composite navigation system 1 of at least one embodiment of the present invention uses a loosely coupled, closed-loop Kalman filter as a navigation system platform. The loosely-coupled, closed-loop Kalman filter uses three single-axis linear accelerometers, three single-axis angular accelerometers, and two thermal convention inclinometers (one for measuring pitch angle and another for measuring roll angle) as a major part of an inertial navigation system (INS) 118, as shown in FIG. 5. The loosely coupled, closed-loop Kalman filter uses the GPS receiver to determine yaw angle. Because accurate results can be obtained, another inclinometer can be omitted. The INS 118 can be integrated with the GPS receiver 12. Generally, the GPS receiver 12 can provide stable, non-divergent position data; however, it can only provide one data message per second. Moreover, since the INS 118 generates data fast and the linear accelerometers and the angular accelerometers have drifting and bias issues, the INS 118 has a serious divergent problem. If the output data of the GPS receiver 12 is introduced to the Kalman filter 132, the divergent problem caused by drifting can be corrected. As a result, integrated GPS receiver 12 and INS 118 can provide accurate position, speed and attitude, and the navigation accuracy and navigation data update speed can be improved.

Figure 6:
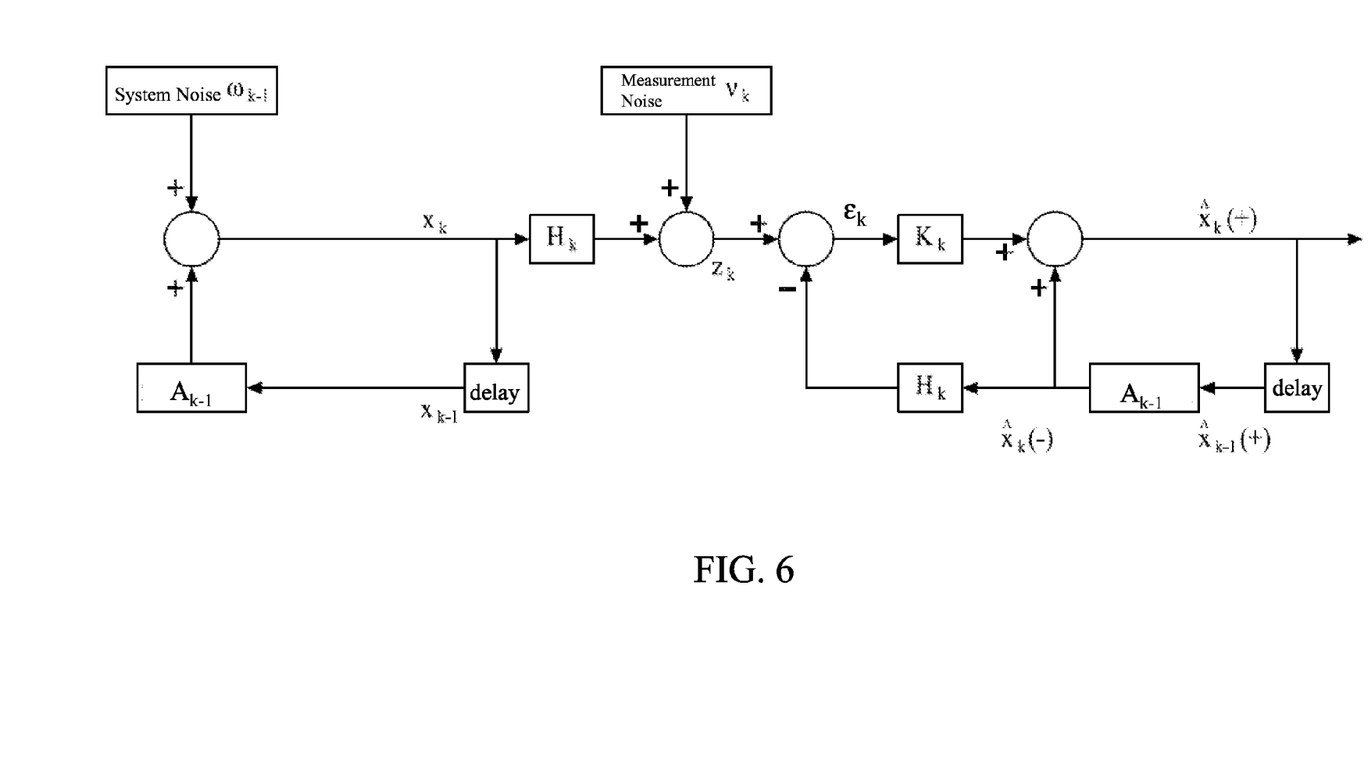
FIG. 6 is a block diagram related to a Kalman filter according to one embodiment of the present invention.

Referring to FIGS. 5 and 6, a continuous or discrete stochastic system and its plant and measurement equations are discussed as follows. In order to simplify explanation, a linear navigation system for a plane is only considered.

Assuming that $X_1$ is a position on the X axis; $X_2$ is a position on the Y axis; $X_3=V_x$, where $V_x$ is a velocity along the X axis; $X_4=V_y$, where $V_y$ is a velocity along the Y-axis; $\dot{X}_3=A_x+W_x$, where $A_x$ is an acceleration along the X-axis and $W_x$ represents noise; $\dot{X}_4=A_y+W_y$, where $A_y$ is an acceleration along the Y-axis and $W_y$ represents noise, a navigation equation or state equation for a planar movement can be expressed as:

$$\begin{bmatrix} \dot{X}_1 \\ \dot{X}_2 \\ \dot{X}_3 \\ \dot{X}_4 \end{bmatrix} = \begin{bmatrix} 0 & 0 & 1 & 0 \\ 0 & 0 & 0 & 1 \\ 0 & 0 & 0 & 0 \\ 0 & 0 & 0 & 0 \end{bmatrix} \begin{bmatrix} X_1 \\ X_2 \\ X_3 \\ X_4 \end{bmatrix} + \begin{bmatrix} 00 \\ 00 \\ 10 \\ 01 \end{bmatrix} \begin{bmatrix} A_X \\ A_Y \end{bmatrix} + \begin{bmatrix} 0 \\ 0 \\ W_X \\ W_Y \end{bmatrix} \quad (2)$$

Equation (2) can also be expressed by $\dot{X}=Ax+Bu+w$. Equation (2) is solved by using Taylor's series expansion.

$$X_{k+1} = (I+A\tau)\left[X_k + \int_0^T (I-A\tau)(B(\tau)\mu(\tau)+w(\tau))d\tau\right] \quad (3)$$

where $$I = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

$$A\tau = \begin{bmatrix} 0 & 0 & \tau & 0 \\ 0 & 0 & 0 & \tau \\ 0 & 0 & 0 & 0 \\ 0 & 0 & 0 & 0 \end{bmatrix}$$

Because the sampling period $T(=\tau)$ is small, equation (3) can be written as:

$$X_{k+1} = \begin{bmatrix} 1 & 0 & T & 0 \\ 0 & 1 & 0 & T \\ 0 & 0 & 1 & 0 \\ 0 & 0 & 0 & 1 \end{bmatrix} X_k + \begin{bmatrix} \frac{T^2}{2}A_x \\ \frac{T^2}{2}A_y \\ 0 \\ 0 \end{bmatrix} \quad (4)$$

Through the above derivations, a state equation as shown below can be obtained.

$$x_k = A_{k-1}x_{k-1} + B_{k-1}u_{k-1} + w_{k-1} \quad (5)$$

The GPS receiver can provide both longitude and latitude data, which can be converted into coordinates ($X_1$ on the X-axis, $X_2$ on the Y-axis). The GPS receiver can also provide speed data ($X_3(=V_x)$ is the speed along the X-axis and $X_4(=V_y)$ is the speed along the Y-axis). With the above data, a measurement equation can be obtained $$z_k = H_k x_k + v_k \quad (6)$$

where $w_k$ is system noise and $v_k$ is measurement noise (i.e. the noise of the accelerations $A_X$ and $A_Y$ measured by linear accelerometers). $w_k$ and $v_k$ can be viewed as non-correlated white noise. The system noise $w_k$ and the measurement noise $v_k$ can be used to respectively define a covariance matrix of system noise $Q_k$ and a covariance matrix of measurement noise $R_k$.

$$E[w_k w_i^T] = Q_k \quad i = k \quad (7)$$
$$E[w_k w_i^T] = 0, \quad i \neq k$$

$$E[v_k v_i^T] = R_k \quad i = k \quad (8)$$
$$E[v_k v_i^T] = 0, \quad i \neq k$$

$$E[w_k v_k^T] = 0 \quad (9)$$

Using equation (6) can estimate an optimum state variable of $x_k$ (i.e. $\hat{x}_k$) at time k, and the precision of the state estimation can be evaluated by a covariance matrix $P_k$ as shown below.

$$P_k = E\{[x_k - \hat{x}_k][x_k - \hat{x}_k]^T\} \quad (10)$$

The Kalman filter 132 can use a state variable $x_k(-)$ before calculation, a known observation quantity $z_k$, a covariance matrix of system noise $Q_k$, and a covariance matrix of measurement noise $R_k$ to determine an optimum state variable $\hat{x}_k(+)$ and obtain a minimum $P_k$. The recursive operation equations (11), (12), (13), (14), and (15) of the Kalman filter 132 are shown as follows:

An error covariance extrapolation equation is represented:

$$P_k(-) = A_{k-1} P_{k-1} A_{k-1}^T + Q_{k-1} \quad (11)$$

A Kalman gain matrix is represented by:

$$K_k = P_k(-)H_k^T [H_k P_k(-) H_k^T + R_k]^{-1} \quad (12)$$

An updated error covariance equation ($P_k(+)$) is represented by:

$$P_k(+) = [I - K_k H_k] P_k(-) \quad (13)$$

Updated optimum estimated states are represented by:

$$\hat{x}_k(+) = \hat{x}_k(-) + K_k[z_k - H_k \hat{x}_k(-)] \quad (14)$$

$$\hat{x}_k(-) = A_k \hat{x}_{k-1}(+) \quad (15)$$

A calculation flow chart of the Kalman filter 132 is as shown in FIG. 6.

An optimum state variable $\hat{x}_k(+)$ can be determined by using the following steps:

Step 1: Define initial system values of $\hat{x}_0(+)$, $P_0(+)$, $Q_k$, $R_k$.

Step 2: Use the above equations (11) to (15) to determine an extrapolation value $\hat{x}_k(-)$ before a signal enters the system.

Step 3: Obtain a measurement value $z_k$ from the measurement system.

Step 4: Use the above equations (12) to (14) to determine a gain $K_k$ of the Kalman filter 132, an updated covariance matrix $P_k(+)$, and an updated state variable $\hat{x}_k(+)$.

Generally, an INS with three linear accelerometers and three angular accelerometers is not expensive. However, the linear accelerometers, the angular accelerometers, and the inclinometers all have drifting and bias issues, and furthermore, long-term use of the INS results in poor precision. In addition, when poor weather conditions occur, GPS signals become weak; or when the geometric dilution of precision (GDOP) of satellite configuration geometry become greater, GPS signals become unreliable. However, if the INS is integrated with a GPS receiver by using a Kalman filter, then the weak points of GPS and INS signal issues can be fixed.

Through equation (12), it can be known that when a GPS signal becomes weak or when the geometric dilution of precision of satellite configuration geometry become greater, the measurement noise $R_k$ of the covariance matrix become large and the gain $K_k$ of the Kalman filter 132 become small; and thus, equation (14) can be further simplified as:

$$\hat{x}_k(+) = \hat{x}_k(-) \quad (16)$$

When GPS signals become weak, the composite navigation system 1 uses three linear accelerometers and three angular accelerometers to produce measurement data. In some embodiments, the GDOP is too large, for example, greater than 15 or 20, which is not a limitation to the present invention. The composite navigation system 1 stops using GPS signals.

When GPS signals are strong or the GDOP is small (or in a range of from 6 to 10), the Kalman gain matrix is equal to an identity matrix, and the composite navigation system 1 will produce a similar result as the GPS receiver. It can be seen that the composite navigation system 1 can produce more precise output in comparison with either an inertial measurement unit (IMU) or a GPS device. Therefore, IMU and GPS devices are ideal complementary navigation structures. Moreover, the composite navigation system 1 comprises a plurality of inclinometers, which can be used for measuring pitch angles and roll angles and integrated with the above-mentioned IMU and GPS devices to correct the drifting and bias issues of the linear accelerometers and the angular accelerometers so that the navigation accuracies of vehicle positions, speeds, and attitudes of INS can be improved and the positioning data update rate can be faster than that of GPS.

Figure 7:
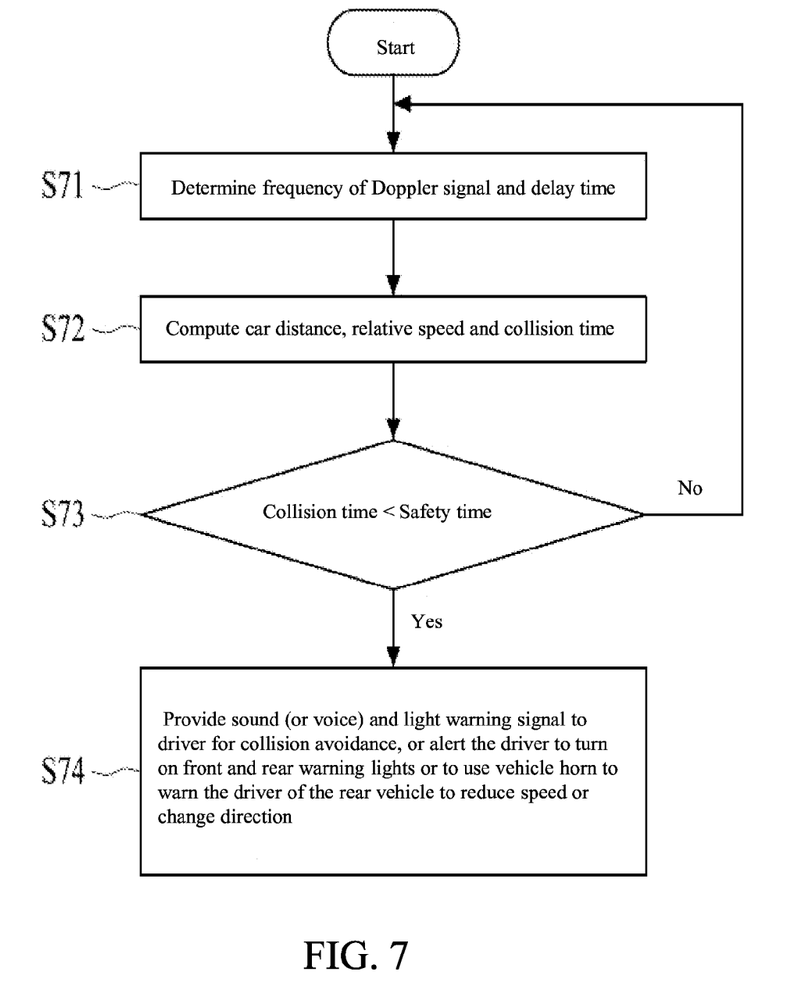
FIG. 7 is a flow chart showing a method of determining a collision time of vehicles and generating a warning signal according to one embodiment of the present invention.

Referring to FIGS. 1 and 7, in some embodiments, the composite navigation system 1 comprises a Doppler radar apparatus 15. The Doppler radar apparatus 15 is used for measuring a distance and a relative speed between two vehicles. The Doppler radar apparatus 15 is coupled with the signal processing system 13. In some embodiments, the signal processing system 13 comprises a processor 133. The Doppler radar apparatus 15 is coupled with the processor 133.

The antenna of the Doppler radar apparatus 15 emits a strong electromagnetic wave, which hits a rear vehicle and then reflects back. In Step S72, the Doppler radar apparatus 15 determines the frequency ($F_D$) of the reflected wave, and thereby calculates the relative velocities ($V_R$) of the two vehicles according to the below equation.

$$V_R = C/F_D \quad (17),$$

where C is the light speed.

In Step S71, the Doppler radar apparatus 15 of the composite navigation system 1 can determine the frequency of a Doppler signal from a rear vehicle. After the processor 133 calculates a time delay $\tau_D$, the processor 133 determines a relative distance to a rear vehicle according to the following equation.

$$R = \tau_D V_R / 2 \quad (18)$$

In Step S72, the composite navigation system 1 or the signal processing system 13 can determine a collision time $\tau_I$ by using the relative distance and relative velocity. In Steps S73 and S74, the composite navigation system 1 or the signal processing system 13 generates sound (or voice) through the flexible speaker 142 and a light signal through the LED display device 143 as a reference for a driver if the collision time is less than a predetermined safety time, for example, 5 seconds, which is not a limitation to the present invention. The driver may use a vehicle warning light or a vehicle horn to warn the driver of the rear vehicle to reduce vehicle speed or change direction. The collision time $\tau_I$ can be determined by the following equation.

$$\tau_I = R/V_R \quad (19)$$

In some embodiments, the composite navigation system 1 comprises an external extension database 16 coupled with the processor 133. Referring to FIG. 1, in at least one embodiment, the signal processing system 13 of the composite navigation system 1 receives data from the GPS receiver and the first RFID apparatuses 11 and sends the data to the Kalman filter for navigation use. The Doppler radar apparatus 15 is used in particular for detecting a relative distance and a relative speed between two vehicles. The processor 13 calculates a collision time and generates sound (or voice) through the flexible speaker 142 and a light signal through the LEDs display device 143 as a reference for a driver if the collision time is less than a predetermined safety time ($T_S$), whereby the driver may use a vehicle warning light or a vehicle horn to warn the driver of the rear vehicle to reduce vehicle speed or change direction. Regardless of whether an accident occurs, the relevant data including data from the GPS receiver and the first RFID apparatuses 11 and corresponding computed results would be stored in the database 16 for further interpretation and investigation.

It will be apparent to those skilled in the art that various modifications and variations can be made to the disclosed embodiments. It is intended that the specification and examples be considered as exemplary only, with a true scope of the disclosure being indicated by the following claims and their equivalent.

What is claimed is:

1. A composite navigation system comprising:
   a first RFID apparatus disposed on a vehicle, the first RFID apparatus comprising a plurality of inclinometers, a plurality of linear accelerometers, and a plurality of angular accelerometers to detect dynamic information of the vehicle;
   a GPS receiver; and
   a signal processing system comprising:
      a first RFID reader configured to communicate with the first RFID apparatus; and
      a Kalman filter connecting to the GPS receiver and the first RFID reader,
   wherein the first RFID apparatus is configured to submit detected dynamic information to the signal processing system by a standard RFID communication protocol.

2. The composite navigation system of claim 1, further comprising a processor connecting to the Kalman filter.

3. The composite navigation system of claim 2, further comprising an external extension database configured to store data from the first RFID apparatus and the GPS receiver.

4. The composite navigation system of claim 2, wherein the Kalman filter uses data from the GPS receiver to correct navigation data from the first RFID apparatus.

5. The composite navigation system of claim 2, wherein data from the first RFID apparatus comprises pitch angle data and roll angle data.

6. The composite navigation system of claim 2, configured to stop using signals from the GPS receiver when geometric dilution of precision of satellite configuration geometry is greater than 15.

7. The composite navigation system of claim 1, further comprising a second RFID apparatus including a flexible speaker.

8. The composite navigation system of claim 7, wherein the second RFID apparatus further comprises a light-emitting diode display device.

9. The composite navigation system of claim 1, further comprising a Doppler radar apparatus, wherein the composite navigation system is configured to determine a relative speed and a distance between cars according to a frequency of a Doppler radar signal from a rear vehicle and a delay time of a reflected Doppler radar signal.

10. The composite navigation system of claim 9, configured to determine a collision time when a collision occurs according to the relative speed and the distance.

11. The composite navigation system of claim 10, configured to compare the collision time with a safety time, and to generate a sound or voice through a flexible speaker and a light signal through a light-emitting diode display device so as to warn a driver.

12. The composite navigation system of claim 1, wherein the first RFID apparatus is configured to measure a pitch angle of a car.

13. The composite navigation system of claim 12, wherein the first RFID apparatus is configured to measure a roll angle of a car.

14. The composite navigation system of claim 13, wherein the signal processing system is configured to determine a sum of the pitch angle and the roll angle.

15. The composite navigation system of claim 14, wherein the signal processing system is configured to determine a method of early warning.

16. The composite navigation system of claim 13, wherein the plurality of inclinometers are configured to determine the roll and pitch angles.

17. The composite navigation system of claim 16, wherein the plurality of inclinometers are used on a combination vehicle and the signal processing system is configured to determine a sum of a plurality of pitch angles of the combination vehicle or a sum of a plurality of roll angles of the combination vehicle.

* * * * *